United States Patent
Hittle et al.

(10) Patent No.: US 7,117,045 B2
(45) Date of Patent: Oct. 3, 2006

(54) COMBINED PROPORTIONAL PLUS INTEGRAL (PI) AND NEURAL NETWORK (NN) CONTROLLER

(75) Inventors: Douglas C. Hittle, Fort Collins, CO (US); Charles Anderson, Fort Collins, CO (US); Peter M. Young, Fort Collins, CO (US); Christopher Delnero, Maple Shade, NJ (US); Michael Anderson, Denver, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 235 days.

(21) Appl. No.: 10/238,575

(22) Filed: Sep. 9, 2002

(65) Prior Publication Data

US 2003/0055798 A1   Mar. 20, 2003

Related U.S. Application Data

(60) Provisional application No. 60/318,044, filed on Sep. 8, 2001.

(51) Int. Cl.
*G05B 13/02*     (2006.01)
*G06E 1/00*      (2006.01)
*G06E 3/00*      (2006.01)
*F01N 3/00*      (2006.01)

(52) U.S. Cl. .................. 700/48; 123/822; 123/689; 123/695; 706/906; 706/15

(58) Field of Classification Search .................. 700/41, 700/47, 48, 49, 53, 276, 277; 123/692, 689, 123/822; 706/15, 906
See application file for complete search history.

(56) References Cited

U.S. PATENT DOCUMENTS 5,159,660 A * 10/1992 Lu et al. .......................... 706/23

(Continued)

OTHER PUBLICATIONS

Anderson, C. W., Hittle, D., Katz, A. and Kretchmar, R., *Synthesis of Reinforcement Learning, Neural Networks, and PI Control Applied to a Simulated Heating Coil*. Journal of Artificial Intelligence in Engineering, vol. 11, #4, pp. 423-431, 1997. labeled as ATTACHMENT C "(cir 1998)" of priority U.S. Appl. No. 06/318,044 filed Sep. 8, 2001.

(Continued)

*Primary Examiner*—Anthony Knight
*Assistant Examiner*—Sunray Chang
(74) *Attorney, Agent, or Firm*—Macheledt Bales& Heidmiller LLP

(57) ABSTRACT

A neural network controller in parallel with a proportional-plus-integral (PI) feedback controller in a control system. At least one input port of the neural network for receiving an input signal representing a condition of a process is included. A first set of data is obtained that includes a plurality of output values of the neural network obtained during a training period thereof using a plurality of first inputs representing a plurality of conditions of the process. The process/plant condition signals generally define the process/plant, and may include one set-point as well as signals generated using measured systems variables/parameters. In operation, the neural network contributes to an output of the PI controller only upon detection of at least one triggering event, at which time a value of the first set of data corresponding with the condition deviation is added-in thus, contributing to the proportional-plus-integral feedback controller. The triggering event can be characterized as (a) a change in any one of the input signals greater-than a preselected amount, or (b) a detectable process condition deviation greater-than a preselected magnitude, for which an adjustment is needed to the process/plant being controlled. Also a method for controlling a process with a neural network controller operating in parallel with a IP controller is included.

20 Claims, 8 Drawing Sheets

U.S. PATENT DOCUMENTS

| | | | |
|---|---|---|---|
| 5,212,765 A | 5/1993 | Skeirik | |
| 5,282,261 A | 1/1994 | Skeirik | |
| 5,448,681 A | 9/1995 | Khan | |
| 5,450,837 A * | 9/1995 | Uchikawa | 123/692 |
| 5,471,381 A * | 11/1995 | Khan | 700/48 |
| 5,477,444 A * | 12/1995 | Bhat et al. | 700/48 |
| 5,566,065 A * | 10/1996 | Hansen et al. | 700/44 |
| 5,570,282 A | 10/1996 | Hansen et al. | |
| 5,579,746 A * | 12/1996 | Hamburg et al. | 123/689 |
| 5,579,993 A | 12/1996 | Ahmed et al. | 236/49.3 |
| 5,586,221 A * | 12/1996 | Isik et al. | 706/23 |
| 5,625,552 A * | 4/1997 | Mathur et al. | 700/42 |
| 5,720,002 A | 2/1998 | Wang | |
| 5,781,701 A | 7/1998 | Wang | |
| 5,847,952 A * | 12/1998 | Samad | 700/48 |
| 5,870,729 A | 2/1999 | Yoda | 706/26 |
| 5,924,086 A * | 7/1999 | Mathur et al. | 706/25 |
| 6,033,302 A | 3/2000 | Ahmed et al. | 454/238 |
| 6,078,843 A | 6/2000 | Shavit | 700/48 |
| 6,095,426 A | 8/2000 | Ahmed et al. | 236/49.3 |
| 6,145,751 A | 11/2000 | Ahmed | 236/51 |
| 6,220,517 B1 | 4/2001 | Ichishi et al. | 236/49.3 |
| 6,278,962 B1 * | 8/2001 | Klimasauskas et al. | 703/13 |
| 6,330,484 B1 * | 12/2001 | Qin | 700/50 |
| 6,600,961 B1 * | 7/2003 | Liang et al. | 700/48 |

OTHER PUBLICATIONS

Anderson, C. W., Hittle, D., Katz, A. and Kretchmar, R. *Reinforcement Learning, Neural Networks and PI Control Applied to a Heating Coil*. Solving Engineering Problems with Neural Networks: Proceedings of the International Conference on Engineering Applications of Neural Networks (EANN-96), ed. by Bulsari, A.B., Kallio, S., and Tsaptsinos, D., Systems Engineering Association, PL 34, FIN-20111 Turki 11, Finland, pp. 135-142, 1996. labeled ATTACHMENT E of priority U.S. Appl. No. 06/318,044 filed Sep. 8, 2001.

Anderson, C. W., et al, "*Synthesis of Reinforcement Learning, Neural Networks, and PI Control Applied to a Simulated Heating Coil.*" circa 1995; earlier version of 1$^{st}$ above-listed ref. (1997); labeled ATTACHMENT D of priority U.S. Appl. No. 06/318,044 filed Sep. 8, 2001.

European Patent Specification EP 0 721 087 B1 (filed Dec. 19, 1995), Priority Jan. 6, 1995 US 369781 Ahmed, et al.).

Crites, R.H., and A. G. Barto, "*Improving Elevator Performance Using Reinforcement Learning*", Touretzky, et al. eds., Advances in Neural Information Processing Systems 8. MIT Press, Cambridge MA, 1996.

Singh, S., and Dimitri Bertsekas, "*Reinforcement Learning for Dynamic Channel Allocation in Cellular Telephone Systems.*".

Anderson, C. W., and W. T. Miller, "*Challenging Control Problems,*" MIT Press text appendix, pp. 474-509, 1990.

\* cited by examiner

US 7,117,045 B2

COMBINED PROPORTIONAL PLUS INTEGRAL (PI) AND NEURAL NETWORK (NN) CONTROLLER

This application claims priority to now abandoned U.S. provisional patent application Ser. No. 60/318,044 filed on behalf of the assignee hereof on Sep. 8, 2001.

The invention disclosed herein was made, in-part, with United States government support awarded by the National Science Foundation, under contract CMS-9804757. Accordingly, the U.S. Government has certain rights in this invention.

BACKGROUND OF THE INVENTION

1. Field of the Invention

In general, the present invention relates to techniques for training neural networks employed in control systems for improved controller performance. More-particularly, the invention relates to a new feedback control system employing a neural network initially trained on-the-fly on-line or off-line, using a rich set of input (real or simulated data), to emulate steady-state (s—s) in the system that includes a controller connected in parallel with the neural network. Unlike prior attempts to apply neural network techniques to train, and later control, proportional-plus-integral (PI) controllers by conventionally directly adding the output of the neural network to the output of the PI controller, the invention utilizes a unique integral term stuffing technique that uses the learned s—s NN output data to reset the value of a PI control loop with an expected value. As described herein, the control system and method of the invention uses a novel technique that provides for more rapid response within the system, to changes to set-point and other disturbances in input parameters being measured, without the requirement of constant tiresome manual monitoring, dial tweaking, and system control intervention by a technician.

In earlier work of the applicants experimentation was performed on a control system configured to use a PI controller in parallel with a "reinforcement learning agent" into which temperature set point and other variables ($T_{ai}$, $T_{wi}$, Two, $f_a$, and $f_w$), the output of the reinforcement learning agent being added directly to the PI controller output to control a heating coil. For reference, see: Anderson, C. W., et al., "Synthesis of Reinforcement Learning, Neural Networks, and PI Control Applied to a Simulated Heating Coil" (1998); Anderson, C. W., et al., "Synthesis of Reinforcement Learning, Neural Networks, and PI Control Applied to a Simulated Heating Coil" (1997); and Anderson, C. W., et al., "Reinforcement Learning, Neural Networks and PI Control Applied to a Heating Coil." (1996), from "Solving Engineering Problems with Neural Networks: Proceedings of the Conference on Engineering Applications in Neural Networks". As explained in the second-listed reference, Anderson, C. W., et al., (1997)—see FIG. 8 as labeled therein—the applicants trained the reinforcement learning agent (here, by way of example a NN) off-line for 1,000 repetitions, called "trials", of a 500 time-step interaction between the simulated heating coil and the combination of the reinforcement learning agent and the PI controller, to gather data set(s) for augmenting (by direct addition, at point c) the output of the PI controller during periods of actual use to control the heating coil.

In their pursuit to analyze problems related to timely-responsive control of a system comprising a feedback PI controller using trained-NN output, it was not until later that the applicants identified and applied the unique technique of the instant invention, thus allowing for successful recovery to perturbations in system parameters and/or changes to set-point in a manner that returns the system to s—s operation in a more-timely fashion. Accordingly, response and settling times can be decreased significantly, especially when the technique of the invention is applied to a representative experimental system, wherein the NN has been trained with real or simulated data. As will be appreciated (see, especially, FIGS. 1 and 12), when a triggering event (as defined) is detected, the trained-NN output is 'stuffed' in place of the integral term of the PI controller equation. Applicants' novel technique can be characterized using the following progression of expressions, written in discrete form, governing the system and method of the invention (as used in Eqn. A, $O_{NN} \leftrightarrows NN$, either of which represents the learned neural network output for that set of inputs that includes the information about the disturbance); governing the PI controller:

$$O_\tau = K_p e_\tau + K_i \sum_{j=0}^{\tau} e_j \Delta t$$

$$O_{\tau-1} = K_p e_{\tau-1} + K_i \sum_{j=0}^{\tau-1} e_j \Delta t$$

$$O_\tau = O_{\tau-1} + K_p(e_\tau - e_{\tau-1}) + K_i e_\tau \Delta t$$

governing the neural network operating in parallel with a PI controller according to the invention are the following:

$$O_\tau = K_p e_\tau + K_i \sum_{j=0}^{\tau} e_j \Delta t \qquad \text{Eqn. A}$$

$$O_{\tau-1} = K_p e_{\tau-1} + K_i \sum_{j=0}^{\tau-1} e_j \Delta t$$

$$O_\tau = O_{\tau-1} + K_p(e_\tau - e_{\tau-1}) + K_i e_\tau \Delta t$$

$$O_\tau = NN + K_p e_\tau + K_i e_\tau \Delta t$$

As one will readily appreciate, the improvements made by the applicants to their earlier work, include a more-efficient use of a trained-NN (which can be an off-the-shelf learning agent component) by having it sit 'dormant' such that it does not contribute to the PI controller until it detects a (pre-defined) change greater-than a preselected amount or magnitude to one or more process condition signals, at which time a switch allows the trained-NN output, $O_{NN}$, to be 'stuffed' into the PI controller causing a detectable more-rapid response of the system to its desired steady state (s-s). The output term, $O_{NN} \leftrightarrows NN$, is from a set of data learned by the NN during its training period (using a rich set of input, real or simulated) before on-line control of the process/plant, on-the-fly while the process/plant is being controlled, or some combination thereof. Once a significant-enough change triggers action, $O_{NN}$ for that combination of inputs, as disturbed/changed, is stuffed into a discrete form of the PI's integral expression (Eqn. A). Here, the proportional gain constant, $K_p$, and integral gain constant, $K_i$, used can be those determined prior to the disturbance, thus requiring no manual tweaking once the control system has been set up and implemented.

The process condition signals are created using measured systems variables created by, for example, signals from one or more sensors (e.g., in HVAC—heating ventilation air conditioning—this can include one or more sensors/meters to measure airflow, temp of air and water, etc.) and one or more set-points. In operation, a significant change may include a disturbance (% of an initial value) to one of the sensed inputs or a manual change made to a set-point. A range of acceptable change, outside of which is considered 'significant' enough to represent a triggering event for NN action (see note in FIG. 1), can be pre-defined according to environment being controlled, sensitivity of measurement sensors being use, and so on.

Where, in their earlier work applicants' had simply added a learned output of a reinforcement learning agent, NN, to an output of the PI controller, the focus of the unique system and method of the instant invention uses a distinguishable technique. The NN and IP controller pair according to the invention, lowers coil (or any other process/plant) response time as well as minimizing the effect of sluggish control experienced when a PI controller, operating alone, encounters a gain state different than the one at which it had been tuned. The dynamic heating coil PDE (partial differential equation) model has been presented herein by way of example only; as this dynamic coil model allows for process predictions made where several parameters are simultaneously varied in any SISO (single-input, single-output), SIMO (single-input, multiple-output) (multiple-input, multiple-output) control environment. While an HVAC implementation has been showcased here, the NN and IP controller pair is handily retrofitted to control a wide variety of processes/plants (whole systems, subsystems, individual components from separate systems, components of a system, and so on), especially those where a s—s controller value can be predicted by a neural network.

SUMMARY OF THE INVENTION

Briefly described, once again, the invention includes a neural network controller in parallel with a proportional-plus-integral (PI) feedback controller in a control system. At least one input port of the neural network for receiving an input signal representing a condition of a process is included. A first set of data is obtained either off-line, earlier-in-time, or on-line during the operation of the neural network in connection with process control operations. This first set of data includes a plurality of output values of the neural network $[O_{NN}]$ obtained during a training period thereof using a plurality of first inputs representing a plurality of conditions of the process. The plurality of first inputs can comprise real or simulated input information about the process. It is the process/plant condition signals that define the process/plant of the control system. These condition signals preferably include at least one for set-point as well as those condition signals that have been generated using measured systems variables/parameters produced by, for example, signals from at least one sensor or any device for quantitative measurement—for example, in HVAC, this can include sensor(s)/meter to measure airflow, temperature of air and water, etc. Preferably, the neural network controller comprises a feed forward controller. In operation, the neural network contributes to an output $[O_\tau]$ of the PI controller only upon detection of at least one triggering event connected with the input signal, at which time a value of the first set of data corresponding with the condition deviation is added-in thus, contributing to the proportional-plus-integral feedback controller.

In another aspect of the invention, the focus is on a method for controlling a process with a neural network controller operating in parallel with a IP controller. The method includes the steps of: generating a first set of data comprising a plurality of output values of the neural network obtained during a training period thereof using a plurality of first inputs representing a plurality of conditions of a process; receiving, at each of a plurality of input ports of the neural network, an input signal representing a respective condition of a process; and the neural network to contribute to an output of the PI controller only upon detection of at least one triggering event, this triggering event comprising a change in any one of the respective input signals greater-than a preselected amount, indicating a condition deviation. The contribution to the output preferably comprises adding-in a value of the first set of data corresponding with the condition deviation, to the IP controller.

There are many further distinguishing features of a system and method of the invention. Any multitude—second, third, fourth, and up—of input ports can be accommodated for receiving, respectively, second, third, fourth, etc., input signals representing a multitude of conditions of the process. Preferably one of the input signals represents a condition set-point. The training period may be substantially completed prior to receiving the input signals (off-line) in connection with controlling the process, the training period may take place (on-line) during the step of receiving input signals in connection with controlling the process, or some combination thereof. The triggering event can be characterized as (a) a change in any one of the multitude of input signals greater-than a preselected amount, indicating a condition deviation, or (b) a detectable process condition deviation greater-than a preselected magnitude, for which an adjustment is needed to the process/plant being controlled. The preselected amount or magnitude can include a fraction (for example, selected from a range from about 1% to 5%) of a neural network prediction value from the first set of data corresponding to that which has been learned (during training of the neural network) for a particular respective combination of first inputs. For example, the change or detectable condition deviation may be caused by a disturbance of the process/plant (that is due, for example, to a significant enough deviation from steady-state of any of the process conditions); or in the case where the input signal represents a condition set-point, the change may be caused by an alteration (manual or automatic/computer initiated) thereof.

In another characterization of the system or method of the invention using expressions, upon detection of the triggering event, a value of the first set of data corresponding with the condition deviation (this value represented below as $O_{NN}$) is added to the proportional-plus-integral feedback controller according to a discrete form of the proportional-plus-integral feedback controller expression (where 'time', while in other places has been designated t, is represented instead below by $\tau$):

$$O_\tau = O_{NN} + K_p e_\tau + K_i e_\tau \Delta t$$

where $O\tau$=proportional-plus-integral controller output e=error, equal to the difference between set point and measured value of controlled variable $K_p$=proportional gain constant $K_i$=integral gain constant $\Delta t$=sampling rate, s.

The particular output value, $O_\tau$, derived by the addition of the value of the first set of data, $O_{NN}$, to the PI controller, can then be used as a process input for the process/plant under the control of the neural network and PI controller pair.

BRIEF DESCRIPTION OF THE DRAWINGS AND ATTACHMENT A

For purposes of illustrating the innovative nature plus the flexibility of design and versatility of the preferred system and process disclosed hereby, the invention will be better appreciated by reviewing the accompanying drawings (in which like numerals, if included, designate like parts) and ATTACHMENT A. One can appreciate the many features that distinguish the instant invention from known systems and techniques. The drawings have been included to communicate the features of the innovative control system and associated technique of the invention by way of example, only, and are in no way intended to unduly limit the disclosure hereof.

FIG. 1 schematically depicts a control system 10 of the invention, the neural network inputs of which, by way of example only, have been labeled here to represent HVAC (heating ventilation air conditioning) process/plant conditions.

FIGS. 2–4 schematically depict various aspects of the components of a HVAC model system which can be employed to carry out features according to the invention.

FIG. 5 schematically depicts a suitable feed forward neural network controller (represented by block 14 in FIG. 1) having a multitude of inputs-here, by way of example, four HVAC process conditions are represented 52.

FIG. 6 schematically depicts a suitable HVAC reference PI controller 60 which can be employed according to the invention.

Figure 9:
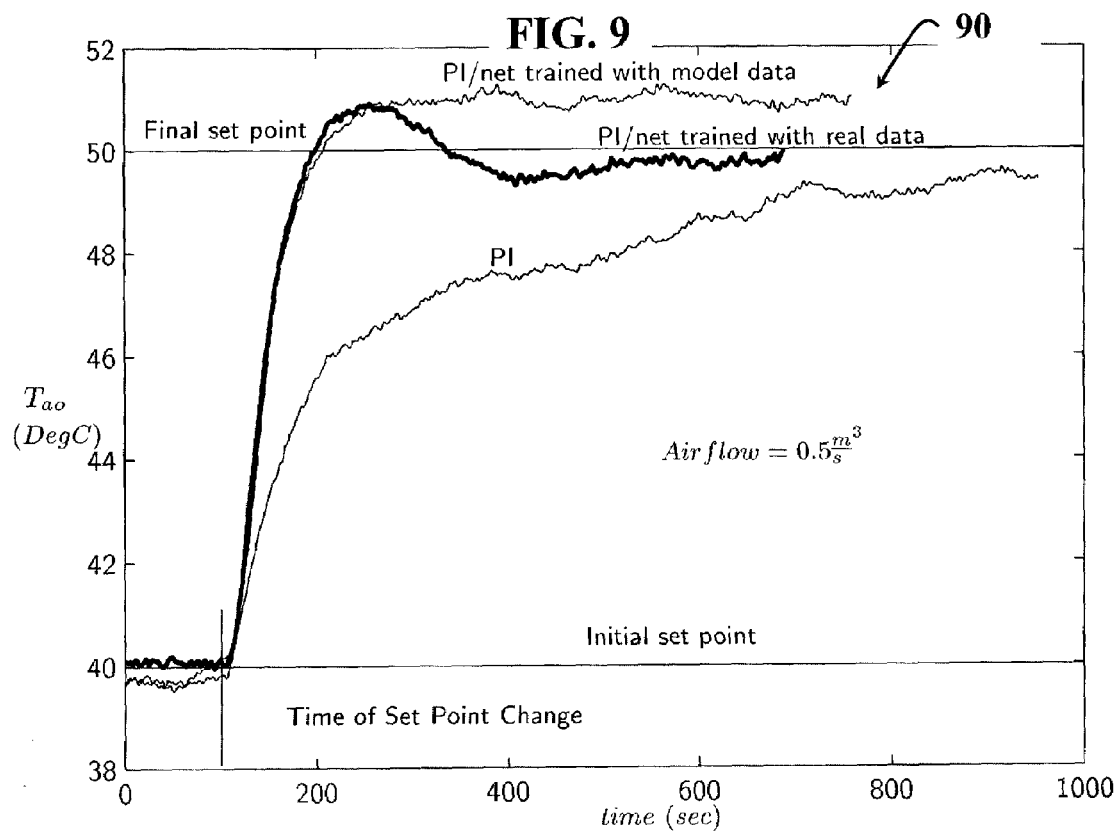
Figure 10:
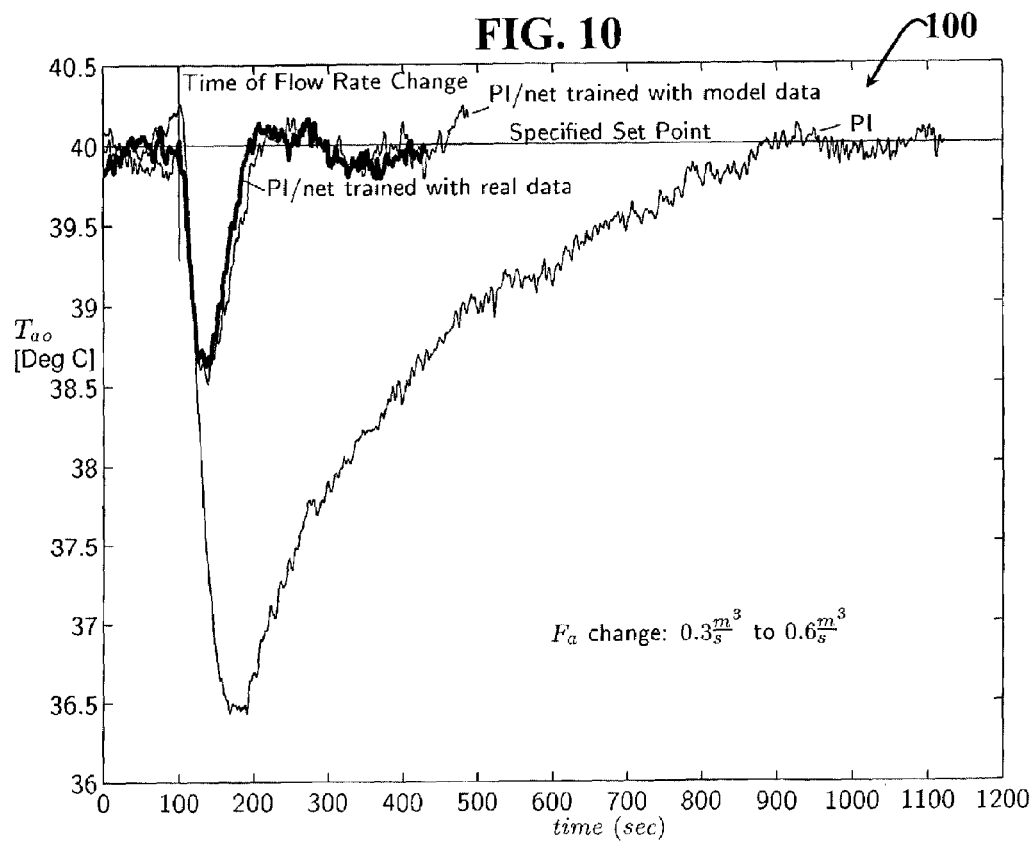

FIGS. 9–10 graphically depict dynamic comparisons for three controller configurations as labeled on the curves: PI/NN pair trained with model (simulated) data; PI/NN pair trained with real data; and PI acting alone. FIG. 9 compares curves of controller (as configured) response to a change in set-point temperature for several gain states. FIG. 10 compares curves of controller (as configured) response for a change in air flow rate while keeping the same set-point.

Figure 11:
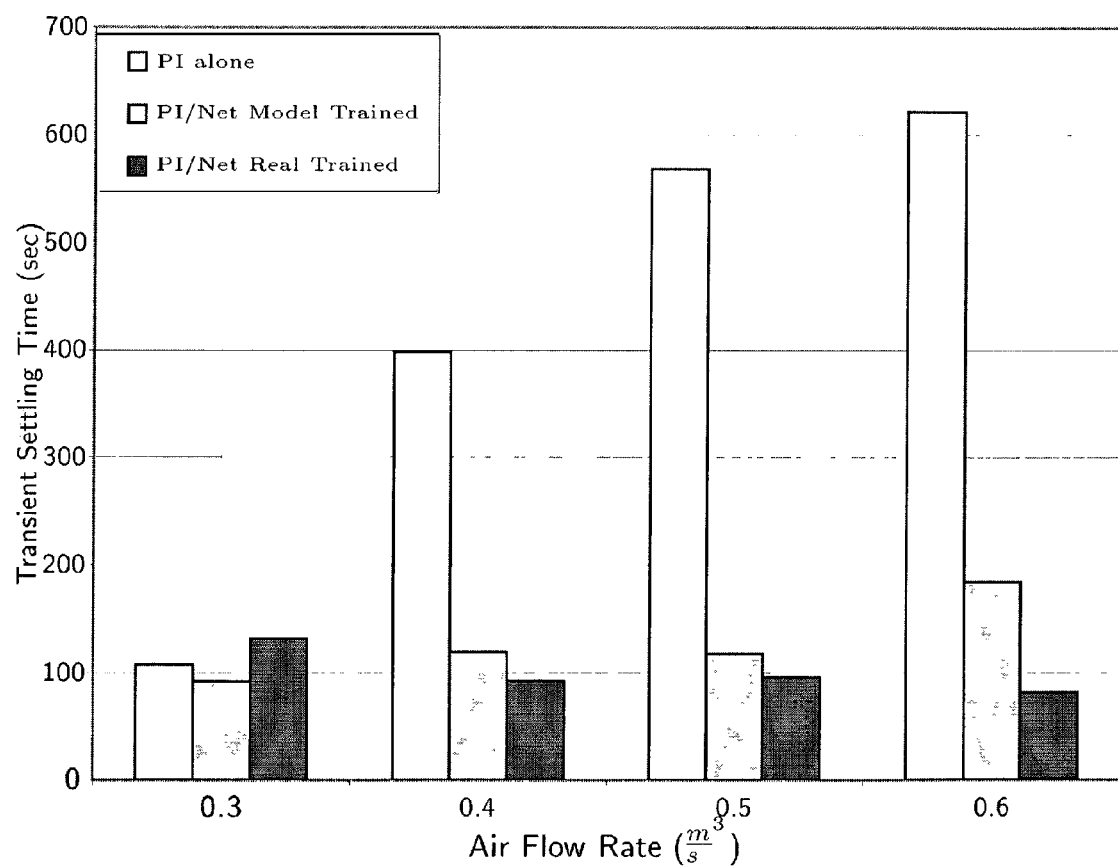

FIG. 11 graphically depicts, in bar graph form, a comparison of settling times for four identified air flow rate change values (x-axis); once again three configurations of controllers are shown: PI/NN pair trained with model (simulated) data; PI/NN pair trained with real data; and PI acting alone.

Figure 12:
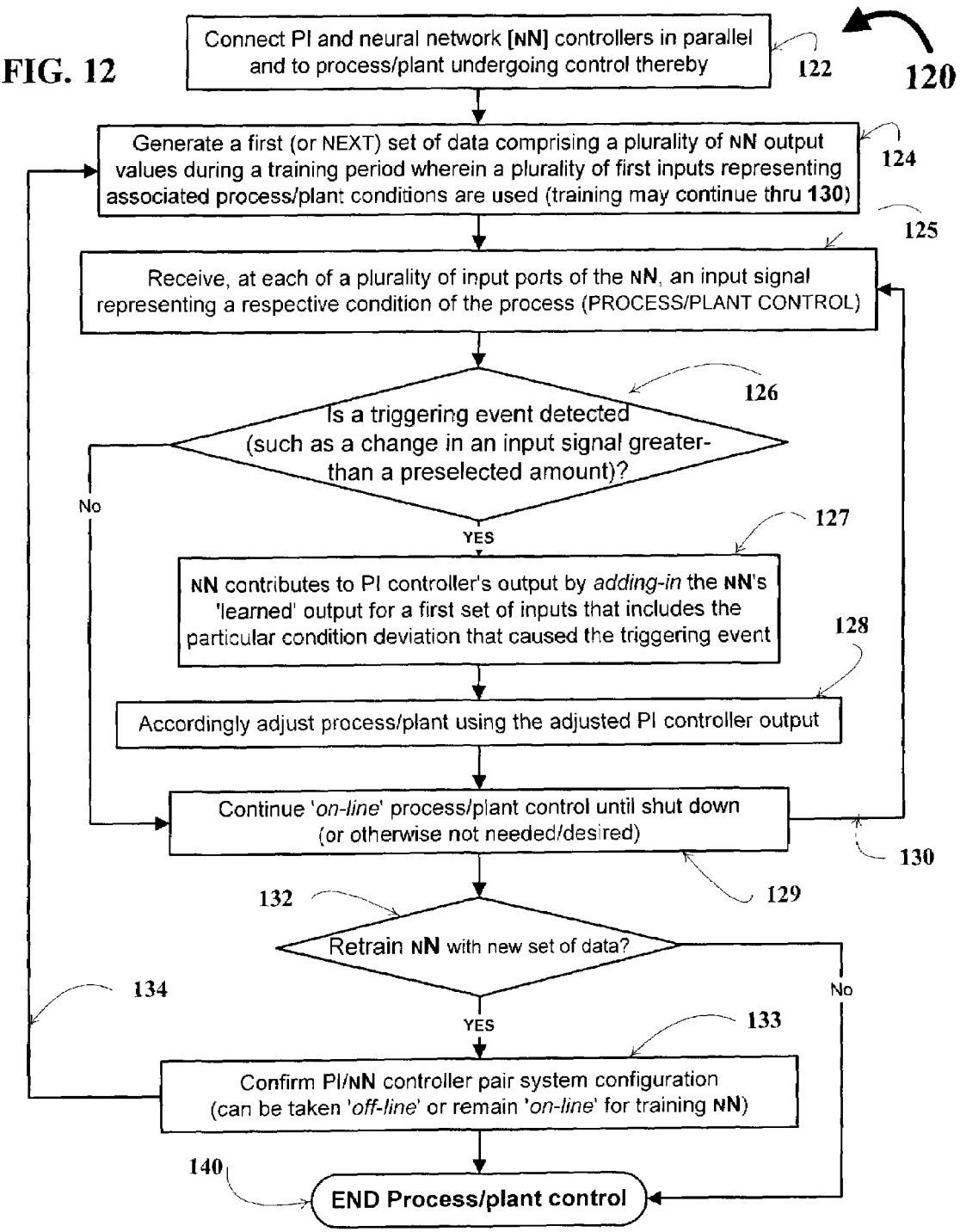

FIG. 12 is a flow diagram depicting details of a method 120 for controlling a process/plant with a neural network controller operating in parallel with a PI controller according to the invention—illustrated are core, as well as further distinguishing, features of the invention employing system features such as those represented and depicted in FIGS. 1 and 2–8.

ATTACHMENT A, a thirteen-page manuscript authored by the applicants entitled: "*Neural Networks and PI Control using Steady State Prediction Applied to a Heating Coil.*" included herewith for its technical background and analysis and support of the system and process of the invention is hereby incorporated herein by reference to the extent necessary to aid in further understanding the mathematical and rigorous engineering analyses performed by the applicants in support of their invention—Section 2 of ATTACHMENT A further details the application of an of an effectiveness—NTU (Number of Transfer Units) model to the instant invention.

DETAILED DESCRIPTION OF THE DRAWINGS

Figure 1:
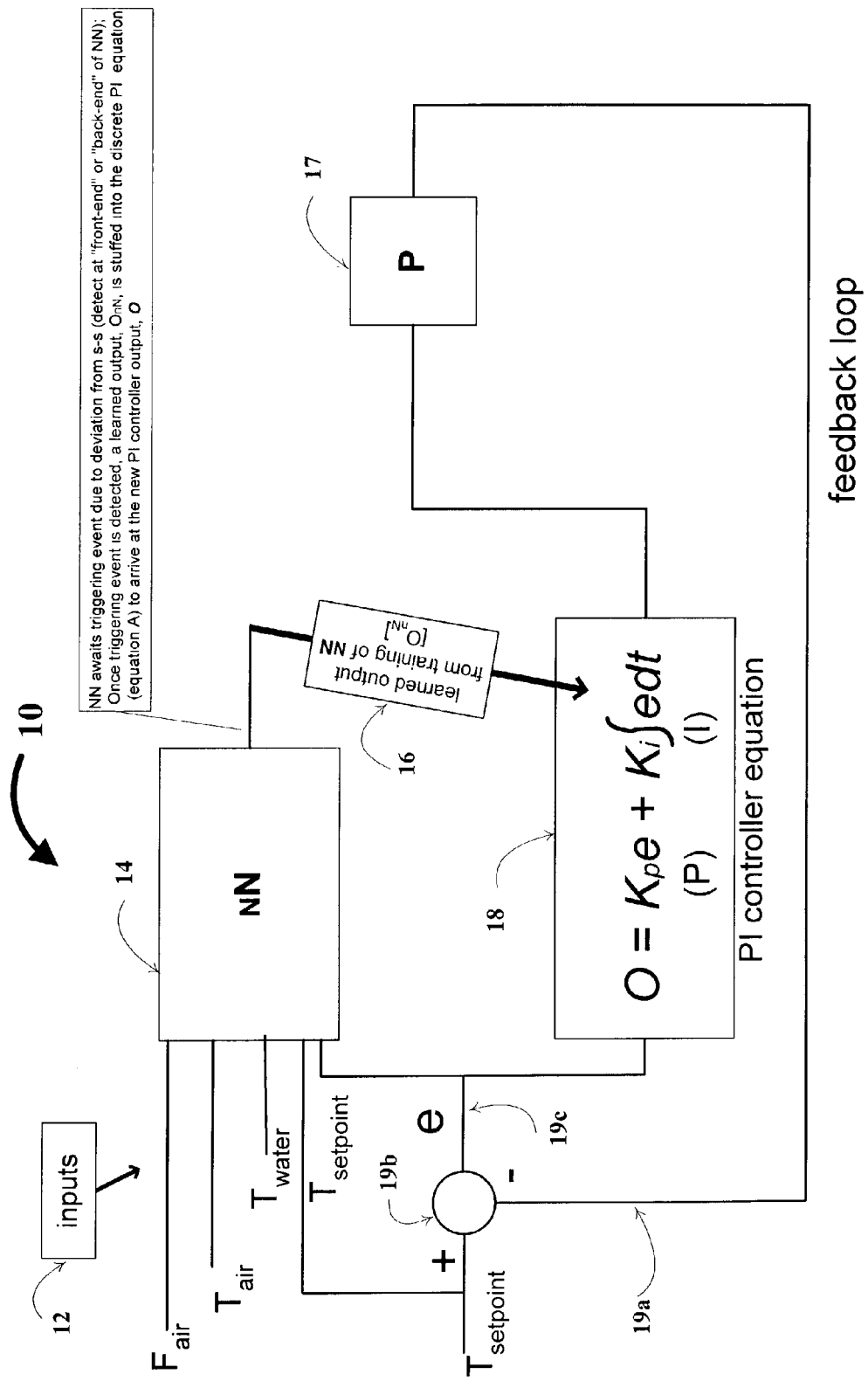

FIG. 1 schematically depicts a control system 10 of the invention. The neural network inputs 12, by way of example only, have been labeled here to represent HVAC process/plant conditions. Inputs 12 include $F_{air}$, $T_{air}$, $T_{water}$, $T_{setpoint}$ (as dialed), and e via 19c (error calculation between $T_{setpoint}$ and that from feedback 19a). Reference will also occasionally be made to features depicted in FIG. 12 detailing method 120.

Figure 2:
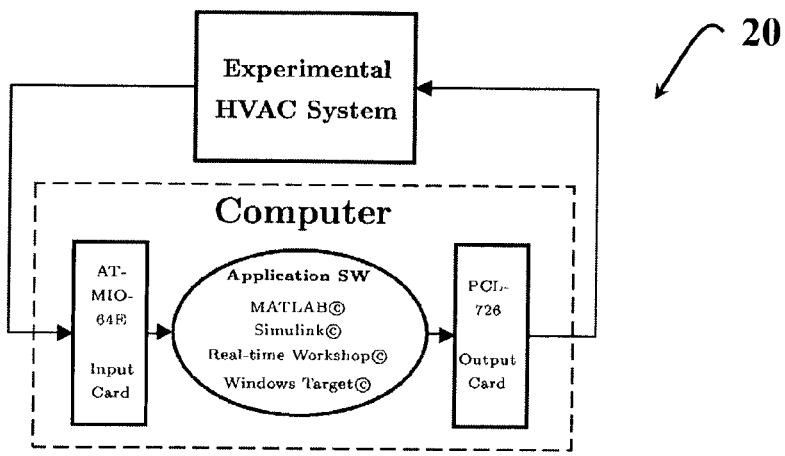
Figure 3:
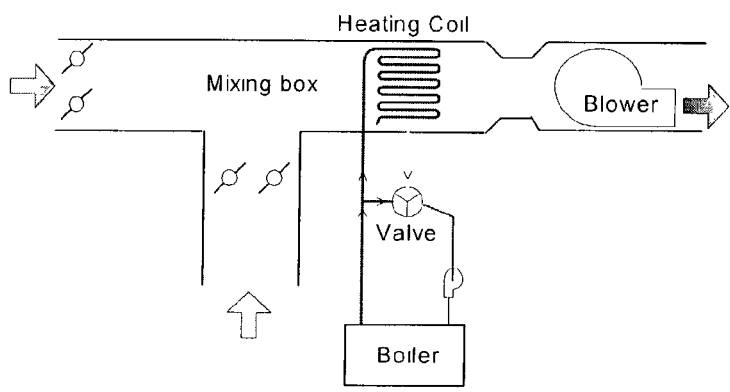
Figure 4:
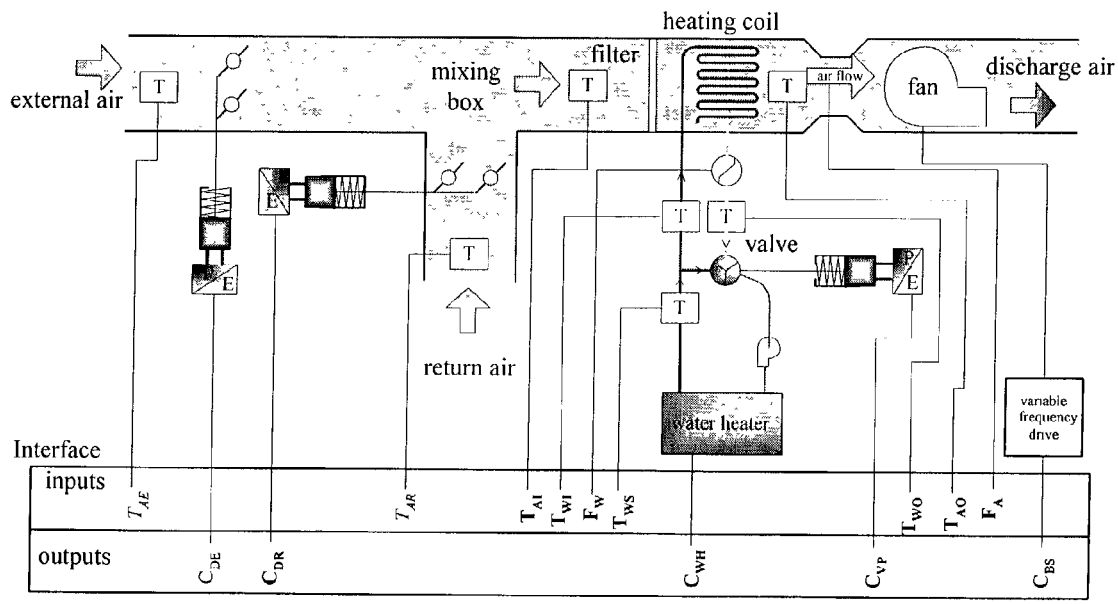

FIGS. 2–4 schematically depict various aspects of the components of a HVAC model system which can be employed to carry out features according to the invention. In particular, at 20 in FIG. 2 is a suitable a computer control setup. FIG. 3 at 30 and FIG. 4 at 40 each represent features of a typical process/plant (represented by block 17 in FIG. 1) that can be controlled according to the invention—with FIG. 4 providing parameter measurement details regarding process information in connection with the HVAC example showcased herein. Jumping to FIG. 6, the suitable HVAC reference PI controller at 60 simply provides a bit more schematic detail of measured variables and system parameters for correlation to the example provided herein, including the graphical data-comparison curves shown in FIGS. 9–11.

Figure 5:
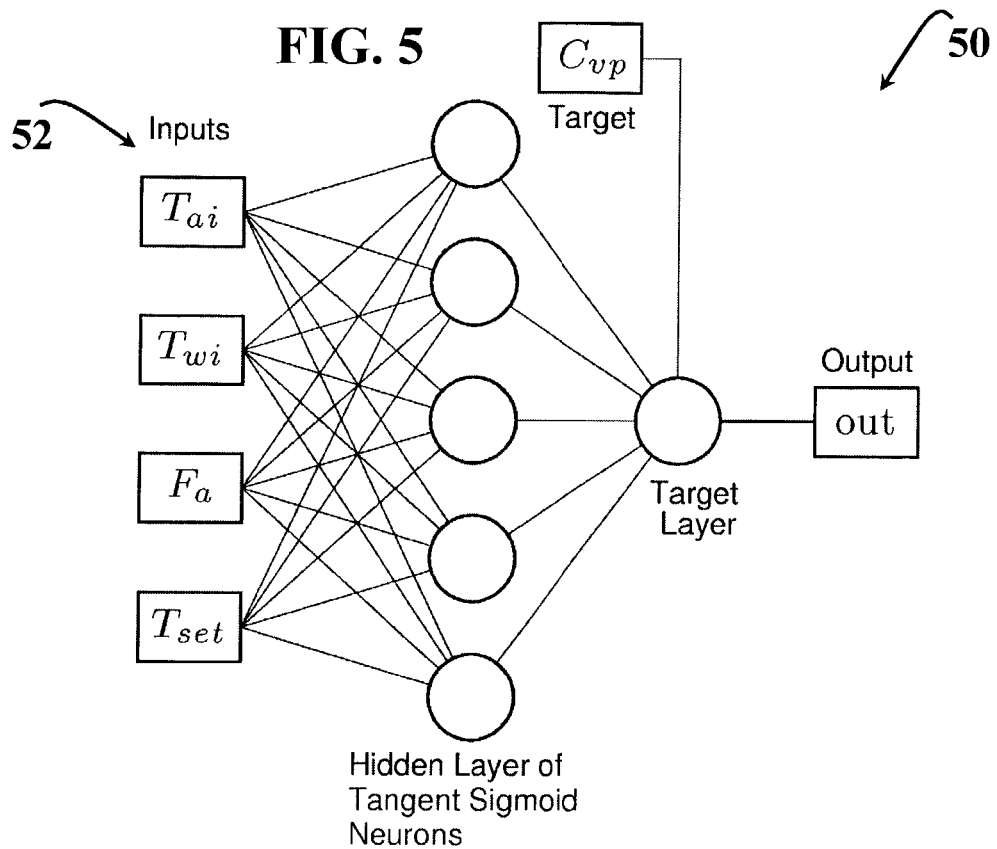

FIG. 5 schematically depicts a suitable feed forward neural network controller 50 (represented by block 14 in FIG. 1) having a multitude of inputs—here, by way of example, four HVAC process conditions are represented by inputs identified at 52. During training of the NN 50, as is conventional for this type of network, a hidden layer of tangent sigmoid neurons is employed to provide for a target or predicted NN output (labeled "out") for any given set of inputs 52. As has been mentioned, training may begin before on-line system control of a given process/plant is begun, during system control, or a combination of both (see, also FIG. 12 at 124 and 133/134).

Figure 7:
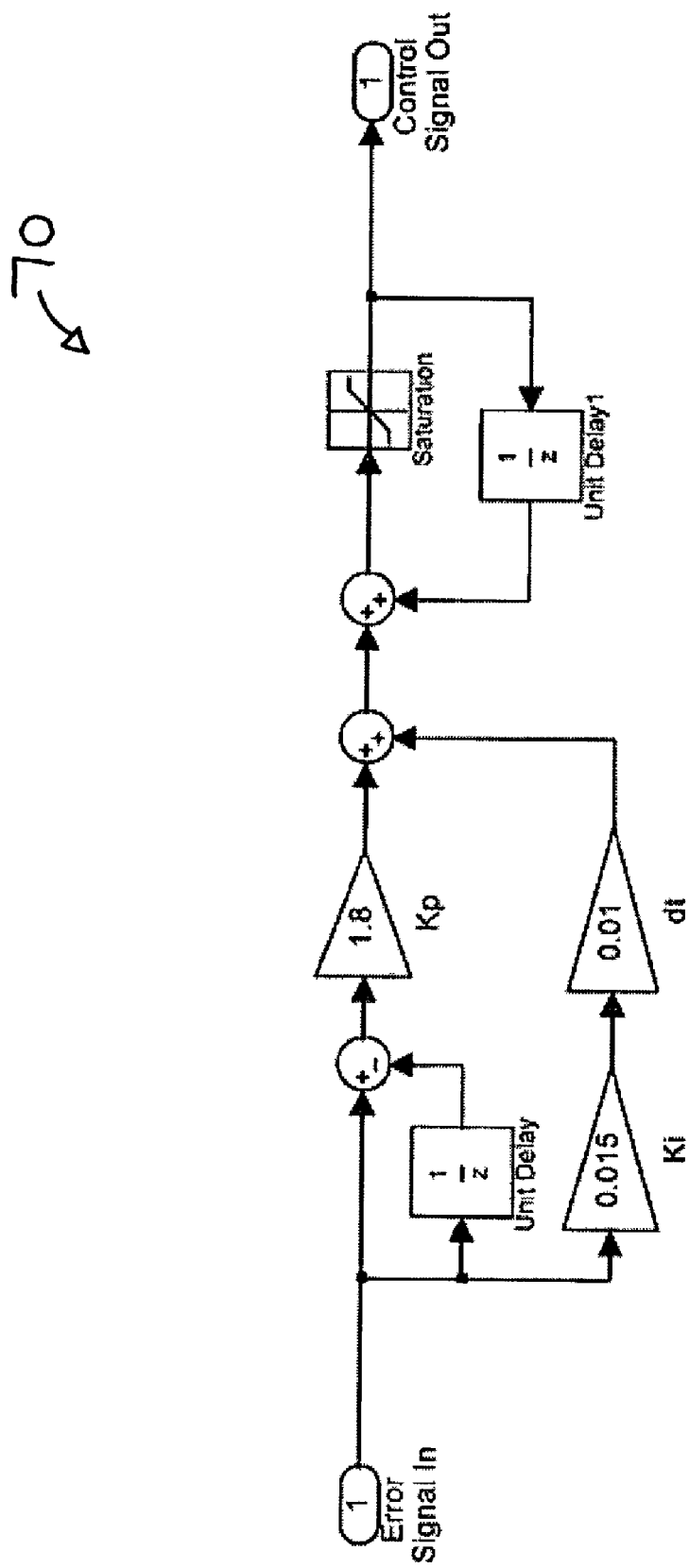
FIG. 7 is a schematic detailing a MATLAB™ implementation model of a PI controller, alone, such as that suitable for use according to the invention.
Figure 8:
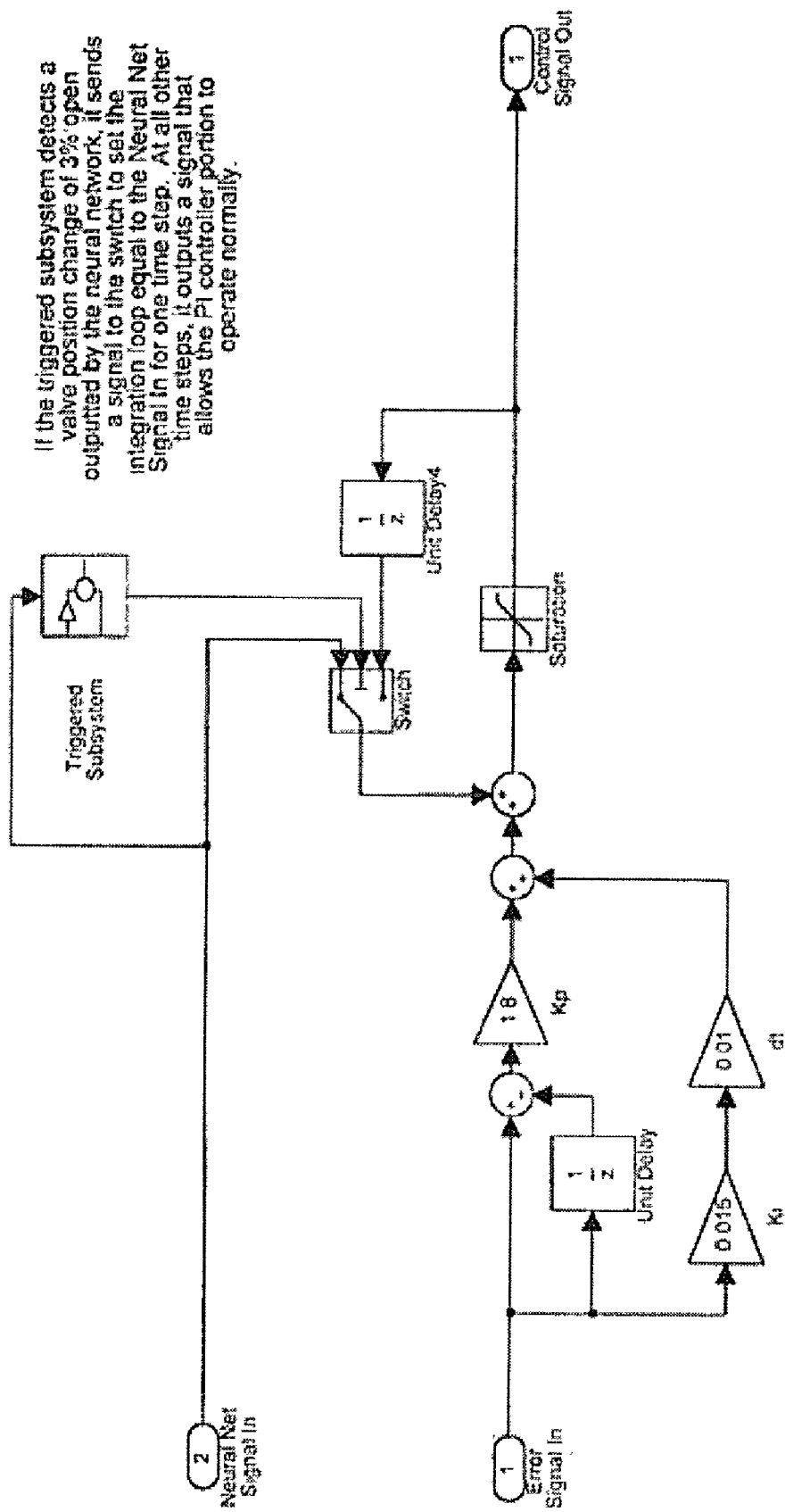
FIG. 8 is a schematic detailing a MATLAB™ implementation model of a neural network and PI controller pair connected in parallel to control a process/plant such as that labeled 17 in FIG. 1.

FIG. 7 is a schematic detailing a MATLAB™ implementation model of a PI controller 70, alone, such as is suitable for use according to the invention. FIG. 8 is a schematic detailing a MATLAB™ implementation model of a neural network and PI controller pair 80 connected in parallel to control a process/plant (e.g., FIG. 1 at 17).

Reference will be made to various drawings in connection with HVAC examples provided herein for purposes of discussion analysis and detailing implementation of aspects of the invention. As mentioned, the control system and method are not limited to an HVAC environment; but rather, a multitude of control environments is contemplated. To analyze the performance of the neural network controller, a standard single input single output (SISO) PI controller was implemented on a heat exchanger under feedback control. The formulation of the neural network controller as dynamically modeled for purposes of the invention, is tied to a steady-state prediction model. One suitable model for neural network steady-state prediction is the known effectiveness-NTU method. This method was used by the applicants by way of example, and employs the use of heat transfer coefficients and coil geometric data to express the heat transfer from the water to air. ATTACHMENT A Section 2, further details the application of this model to the instant case (see also, the experimental HVAC system setup 40 shown in FIG. 4). Outlet air temperature was the measured value of the controlled variable while the hot water valve position was the controlled variable. The general PI control equation can be written as:

$$O = K_p e + K_i \int e\, dt \qquad \text{Eqn. 1}$$

where
 O=controller output, valve position
 e=the error, equal to the difference between set point and measured value of controlled variable, $T_{set} - T_{ao}$, [–]
 $K_p$=proportional gain constant, [–]
 $K_i$=integral gain constant
Written in discrete time Eqn. 1 becomes $$O_t = K_p e_t + K_i \Delta t \sum_{j=0}^{t} e_j \qquad \text{Eqn. 2}$$

where
 Δt=sampling rate, s

In order to obtain the proportional and integral constants, a trial and error method was used, here. The value of the proportional constant was found to be 1.8 [–]. With this value, the integral constant was increased in small increments until the stead state error observed with proportional only control was eliminated but without an oscillatory response. The value of the integral constant was found to be 0.015 [1/s]. Next, a measure of the open loop response of the system was done for a change in the valve position. The proportional and integral gains to produce a critically damped closed loop response were found using the following expressions:

$$K_p = \frac{\tau}{T_d K_s} e^{-1} \qquad \text{Eqn. 3}$$

$$K_k = \frac{K_p}{\tau} \qquad \text{Eqn. 4}$$

where $\tau$=system time constant measured with the open loop response, [s]

$T_d$=system time delay, [s]

$T_s$=system gain, |initial $T_{ao}$–final $T_{ao}$|, [−]

$e^{-1}$=exp(−1)=0.368 (e is not the error, here)

This method produced a proportional constant of 2.0 [−] and an integral constant of 0.02 [1/s]. The values of $K_p$=1.8 [−] and $K_i$=0.015 [1/s] were chosen because they were determined experimentally for this study's heat exchanger. For further reference, the MATLAB™ discrete time implementation of the PI controller is shown in FIG. 7.

Continuing with the current example (for reference see FIGS. 9–10 and 6), the PI controller was tuned in this way to the highest gain condition expected by the coil. The air flow was set to a value around 0.3 m³/s of the 0.9 m$^s$/s air flow range, and the water flow was kept small by keeping the outlet air temperature set point near the inlet air temperature values. The PI controller was tuned at this state so that it would remain stable at all other gain states expected by the coil. At low gain states such as those at higher air and water flow rates, the PI constants chosen were generally expected to produce sluggish control of the outlet air temperature.

Figure 6:
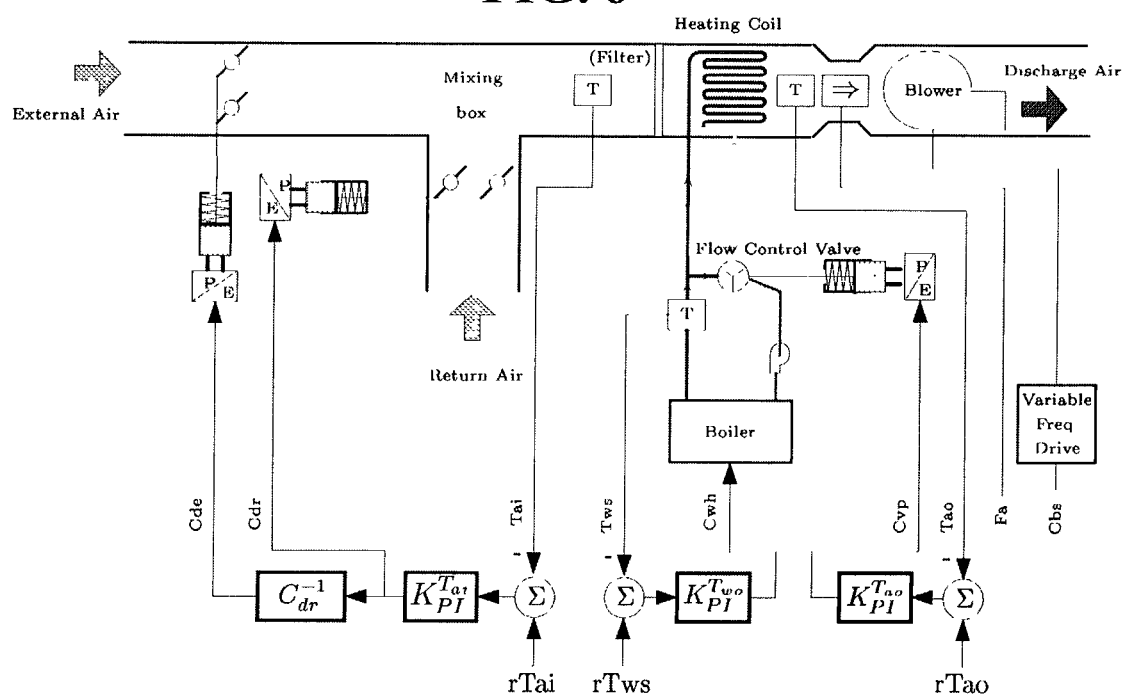

Turn now to FIG. 6, where process control is focused on finding a valve position that will bring the heating coil's outlet air temperature to a desired set-point. Preferably, if at the moment of a set-point change or system disturbance, the PI controller is set to the value that the integral term of the PI control expression [Eqn. 1] would eventually sum to, in an effort to bring the outlet air temperature to the specified set-point, then the valve could be repositioned right then. By positioning the valve instantaneously to a final/desired position, the time that conventional PI control takes to wind up to this position (i.e., the device behavior associated with an integral term) is eliminated. The steady-state prediction needed for this type of more-responsive control is accomplished by using a well-trained neural network according to the invention. The output of the neural network will "stuff" the PI control loop by replacing the integral term with the correct steady-state valve position the moment of a set point change (or other disturbance) rather than reaching that same valve position after the length of time needed for the integral loop to accrue the same value. See FIG. 8 at 80 for a schematic depiction of implementing applicants' unique NN output stuffing technique. Results are that response time is greatly decreased since the valve can be nearly instantaneously set to a final desired valve position to, in turn, attain a desired air outlet set point. For further reference, see also FIG. 1 at 14, 16, 17, 18, as well as FIG. 12 at 127 and 128.

To predict the final steady state valve position, a neural network was created using the Neural Network Toolbox in MATLAB™. A schematic of the neural net modeled is shown in FIG. 5. The neural network (50, FIG. 5) was trained to produce the correct valve position command that corresponds to the state of four coil parameters by way of example as labeled at 52: inlet air temperature, water inlet temperatures, air flow rate, and desired air outlet temperature set point. In connection with the process (FIG. 1 at 17) as labeled in FIG. 5, the valve position command, $C_{vp}$, is that which corresponds to the valve position that will bring the heating coil to a desired set-point. For three conditions, a valve position exists that will bring the coil outlet air temperature to the desired set point.

In this example, the neural network was first trained using data sets produced using the steady state model discussed earlier: the effectiveness-NTU method. The model was used to calculate the valve position that would obtain the specified set point ($T_{set}$) while accounting for the three coil inputs: $T_{wi}$, $T_{ai}$, and $F_a$ (FIG. 5). The inlet water temperature ranged between 45° C. and 60° C., the air inlet temperature between 10° C. and 35° C., the airflow rate between 0.2 m³/s and 0.9 m³/s, and the outlet air set-point between 30° C. and 55° C. Again, a preferred corresponding valve position for these parameters was found using the steady-state model. Here, 2000 data sets were produced to train the neural network, 100 data sets were used for validation, and another 100 more data points were used to measure the performance of the neural network on data it had not seen before (totaling 2200 data sets).

A second neural network was trained using data obtained directly from steady-state experiments. Real data training was necessary so that controllers could be trained without the use of a complicated mathematical model but on past coil performance data. To obtain real steady-state data, several open loop tests were performed for varying coil inlet conditions. Due to anticipated measurements fluctuations associated with real (as opposed to simulated/model) data, steady-state was defined to exist when the fluctuating signals were centered around an obvious specific value for more than 100 seconds. To record data at steady-state, the mean value of all the signals needed for training were taken over a 50 second period within the region determined to be centered on a specific value. For the neural network trained with real data, 100 data sets were used for training, 30 for validation, and another 30 for performance measure. These 160 data sets contained the same variables used in training that the neural network trained with model data used.

In training the neural network (whether by model/simulated data or real data), it was found that the performance of the networks depended on how many neurons the hidden layer of the network contained (FIG. 5). Two neurons in the hidden layer may be sufficient, due in large part because as neurons were added, this was found to increase training time without increased network performance. Recent technological advances in computational speed of newer processors, differences in training time for networks with 1 to 100 neurons in the hidden layer appear negligible.

In order to incorporate a neural network in operation with a real time PI controller for purposes of experimentation, the "gensim" command in the MATLAB™ Neural Net Toolbox was used to create a Simulink™ diagram of the neural network. This network took as inputs, the three measured signals of airflow rate $F_a$, air temperature in $T_{ai}$, and water temperature in $T_{wi}$, as well as the desired outlet air temperature set point $T_{set}$. For every time step, the neural network produced a predicted valve position command, $C_{vp}$, corresponding to the valve position that will bring the coil to a desired set-point. Automatic monitoring was done to detect when the neural network produced a valve position that was a value of 3% of the valve position range different than the last time the neural network intervened in the PI control loop. For additional reference see FIG. 12 at 126. When it was observed or detected that the neural network output became greater-than this 3% of the value of the last intervention (+3% or −3%), the method of the invention performs a stuffing for the integral loop with this new neural network output value. This control sequence can be further characterized as follows.

Taking the PI control output at an initial time, t=1

$$O_1 = K_p e_1 + K_i e_1 \quad \text{Eqn. 5}$$

and at the next time set, t=2

$$O_2 = K_p e_2 + K_i e_1 \quad \text{Eqn. 6}$$

then substituting the solution to $K_i e_1$ from Eqn. 5 into Eqn. 6 gives $$O_2 = O_1 + K_p e_2 - K_p e_1 + K_i e_2 \quad \text{Eqn. 7}$$

Eqn. 7 for all time becomes $$O_t = O_{t-1} + K_p(e_t - e_{t-1}) + K_i e_t \quad \text{Eqn. 8}$$

Thus, the current control output $O_t$ depends on a prior control output $O_{t-1}$, the proportional constant times the derivative of the error, and the integral constant times the current error. Notice, here, that taking the derivative of the error and then summing it over time is equivalent to having the error present for just time t.

Applying an example to this: If the PI controller of Eqn. 8 has been at steady-state for a time interval during which the neural network has been consistently predicting a valve position value of, for example 20% open, the neural network does not intervene. If one of the coil inlet conditions changes or the set point changes as to make the neural net predict a valve position less than 17% open or greater than 23% open, then the neural network intervenes in the PI control loop (FIG. 1 at 16 and FIG. 12 at 127). At the time step that the network predicts a valve position ±3% open from the previous 20% open, the neural network replaces the previous control output, $O_{t-1}$, with a current prediction value so the control equation for this time step becomes $$O_t = \text{Net Prediction} + K_p(e_t - e_{t-1}) + K_i e_t \quad \text{Eqn. 9}$$

where

Net Prediction≈the PI controller's final value of $K_i \int$ edit

The controller output is thus set post-haste to what the neural network predicts. As shown above, the neural network stuffs the PI control loop with the value that the integral term would eventually obtain in order to reach the specified set-point. Thus, the time needed for the effect of the integral term to accrue enough error to bring the controller to reach this steady-state value is by-and-large eliminated. For the next time step, the controller reverts back to the original PI control loop of Eqn. 8. The neural net will not intervene again to contribute to the PI output until the neural network's output value is ±3% valve opening (i.e., 3% on either side) than the value it just intervened with. If the value that the neural network just intervened with was equal to 23% valve opening, then the neural network waits until its value crosses 20% (−3%) or 26% (+3%) open before it intervenes the next time. While a deviation of 3% of the valve position was experimentally determined to be one optimum, any suitable range of deviation may be built into the system or process of the invention, such as for similar process control from 1% to 5%, or any other suitable range.

Where the NN controller intervenes in the PI control loop when the neural network shows a valve position change of only 3% open, the neural network intervenes several times in a minute as airflow rate signal fluctuates. In another instance, the PI/NN pair controller trained with real data indicated some inaccurate network predictions, but the integral term of the PI controller was able to correct for this without additional neural network interventions. And it was found that, even with inaccurate neural network prediction(s), the PI/NN trained with real data has a settling time 100 seconds faster than the PI controller acting alone in that case, does. Thus, even when a neural network intervenes with an inaccurate prediction, the PI/NN controller still out performs the PI controller acting alone.

FIGS. 9–10 graphically depict dynamic comparisons for three controller configurations as labeled on the curves: PI/NN pair trained with model (simulated) data; PI/NN pair trained with real data; and PI acting alone. FIG. 9 compares curves of controller (as configured) response to a change in set-point temperature for several gain states. FIG. 10 compares curves of controller (as configured) response for a change in airflow rate while keeping the same set-point. As can be appreciated, the PI/NN pair controllers regain the temperature set point much faster and also with less allowed temperature change than the PI controller acting alone.

FIG. 11 graphically depicts, in bar graph form, a comparison of settling times for four identified air flow rate change values (x-axis); once again three configurations of controllers are shown: PI/NN pair trained with model (simulated) data; PI/NN pair trained with real data; and PI acting alone.

FIG. 12 is a flow diagram depicting details of a method 120 for controlling a process/plant with a neural network controller operating in parallel with a PI controller according to the invention—illustrated are core, as well as further distinguishing, features of the invention employing system features such as those represented and depicted in FIGS. 1 and 2–8. Reference has been made throughout of the novel steps of the method of the invention 120, in connection with other figures. Once the PI/NN pair have been retrofit (step 122) into a control system with a process to which the method of the invention will be applied, training of the neural network as configured (PI/NN pair in place) is begun 124—note that this training, as mentioned above, may be completed here (124) and off-line, or continued throughout control of the process (step 129), or some combination of both. Once a triggering event is detected (126) the NN contributes to PI controller's output by adding-in the NN's 'learned' output for a first set of inputs that includes the particular condition deviation that caused the triggering event (127) to identify a new PI control output such that the process/plant can be accordingly adjusted (128). When ready to shut down for the day, week, month, etc. or otherwise discontinue on-line process/plant control (for whatever reason) 129, if there is no reason to retrain NN (132) the method ends 140.

While certain representative embodiments and details have been shown for the purpose of illustrating the invention, those skilled in the art will readily appreciate that various modifications, whether specifically or expressly identified herein, may be made to these representative embodiments without departing from the novel teachings or scope of this technical disclosure. Accordingly, all such modifications are intended to be included within the scope of the claims. Although the commonly employed preamble phrase "comprising the steps of" may be used herein, or hereafter, in a method claim, the Applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

ATTACHMENT A
Title: A Combined Proportional Plus Integral (PI)
and Neural Network (nN) Controller
Inventors: Hittle, et al
Docket #: CSURF-105P / CSU-01-035

CONFIDENTIAL

Neural Networks and PI Control using Steady State Prediction Applied to a Heating Coil CHRIS C. DELNERO, *Department of Mechanical Engineering, Colorado State University*
DOUGLAS C. HITTLE, *Department of Mechanical Engineering, Colorado State University*
PETER M. YOUNG, *Department of Electrical and Computer Engineering, Colorado State University*
CHARLES W. ANDERSON, *Department of Computer Science, Colorado State University*
MICHAEL L. ANDERSON, *Department of Electrical and Computer Engineering, Colorado State University*

ABSTRACT

A new approach to controlling HVAC heating coils using a neural network to predict the future steady state output of the controller is investigated. The approach implements a controller that resets the value of a proportional plus integral (PI) control loop with the expected value needed to achieve the desired steady state coil temperatures. The traditional PI control method achieves the desired steady state values after the integral term accrues enough summed error to do so. Since the heating coil system has variable gain, performance of the PI control can be sluggish at low gain states. The method investigated in this report shows that by using a properly trained neural network to reset the PI control loop at the moment of a set point change or coil inlet disturbance, the rise time of this PI/net controller is reduced greatly from the rise time of the same PI controller acting alone.

1 INTRODUCTION

Heating in a central HVAC system is often done by controlling the outlet air temperature from a hot water heating coil. Control usually involves a proportional plus integral (PI) control device that monitors the air outlet temperature and modulates the water flow rate via a control valve. A schematic of the heating coil under control of a PI controller is shown in figure 1.

Typically, the PI controller is tuned to produce a quick stable response for the highest gain state of the system. If the system moves to a lower gain, then the controller will remain stable but produce a sluggish response. This happens because the outlet air temperature will not increase as much for a given change in water flow rate at a low gain state as it will for a high gain state. Thus, a longer time is needed for the integral term to accrue enough summed error to bring the system to the newly specified set point. Therefore, most HVAC system PI controllers perform poorly when a low gain state is encountered and perform reasonably well when a high gain state is encountered.

Neural Networks and PI Control using Steady State Prediction Applied to a Heating Coil

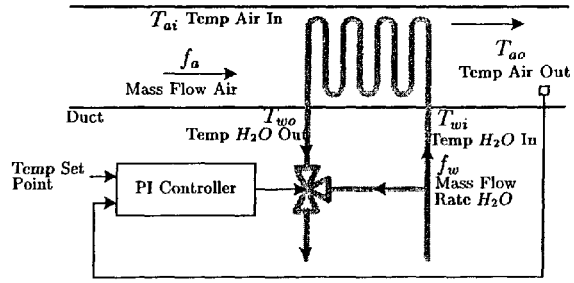

Figure 1: Schematic of heating coil with PI control

If, at the moment of a set point change or system disturbance, the controller could predict the valve position needed to bring the outlet air temperature to the specified set point, then the valve could be repositioned immediately. This would eliminate the time needed for the integral term to bring the system to the steady state and thus produce a controller that could perform well for the entire range of high and low gain states (Anderson et al., 1998).

Neural networks have been used on several HVAC applications. Massie, Curtiss and Kreider (1998), used neural networks to predict chiller equipment performance (Massie et al., 1998). Diaz et al. (1999), used neural networks to analyze heat exchanger data (Diaz et al., 1999). Anderson, Hittle et al. (1998), investigated several PI control configurations using neural networks applied to a HVAC system (Anderson et al., 1996). Curtiss et al. (1994), used neural networks to optimize energy consumption for a commercial scale HVAC system (Curtiss et al., 1994). Ang Heng Kah et al. (1995), used neural networks to control the temperature of an air conditioned bus more effectively (Kah et al., 1995). Seem (1997), while not using neural networks used a pattern recognition adaptive controller (PRAC) to adjust the proportional and integral gain time constant of a controller while under closed loop control (Seem, 1997).

The purpose of this report is to show how using a properly trained neural network to predict future valve positions combined with a PI controller performs as well or better than the same PI controller acting alone for the entire range of gain states expected by the valve and heating coil system.

The experimental apparatus used in this report is shown in figure 2. A variable speed fan near the outlet duct draws air through the system. Outside air enters through the outside air duct and return air enters through a duct open to the inside of the lab. Each air flow is controlled by a parallel blade damper near where the air flows meet in the mixing box. After the mixing box, the air passes through a filter and then through a heating coil. The air finally passes through the fan and is discharged. The hot water side consists of a pump, an electric water heater, an expansion tank, and a three way mixing valve that controls the amount of water flow through the heating coil.

Control hardware consists of 1000 ohm platinum temperature probes connected to data acquisition and control hardware in a personal computer. Control signals from the computer pass to electronic to pneumatic converters whose output modulates valve and damper actuators. In addition, the air flow through the unit is monitored via a calibrated pitot rack. Data acquisition and control was accomplished using Matlab and Simulink

Figure 2: Over View of the HVAC Setup

2 STEADY STATE MODEL

The formulation of the neural network controller relies on the development of a steady state model. The model for the steady state prediction used the effectiveness-NTU method. This method employs the use of heat transfer coefficients and coil geometric data to express the heat transfer from the water to air side. Using equations 1 through 6, the steady state outlet water and air temperatures can be calculated knowing geometric data and heat transfer coefficients that can be found in a coil manufacturers catalog. See Kays and London (Kays an London, 1984) and Incropera and Dewitt (Incropera and Dewitt, 1996) for details.

$$\frac{1}{UA} = \frac{1}{\eta h_a A_a} + \frac{\ln(\frac{D_o}{D_i})}{2\pi k L} + \frac{1}{h_w A_w} \tag{1}$$

$$NTU \equiv \frac{UA}{C_{min}} \tag{2}$$

Neural Networks and PI Control using Steady State Prediction Applied to a Heating Coil $$\varepsilon_p = 1 - \exp\left[\frac{1}{C_r}\left(\frac{NTU}{n}\right)^{0.22}\exp\left[-C_r\left(\frac{NTU}{n}\right)^{0.78}\right] - 1\right] \tag{3}$$

$$\varepsilon = \frac{\left[\frac{1-\varepsilon_p C_r}{1-\varepsilon_p}\right]^n - 1}{\left[\frac{1-\varepsilon_p C_r}{1-\varepsilon_p}\right]^n - C_r} \tag{4}$$

$$T_{aoss} = T_{ai} + \frac{\varepsilon C_{min}(T_{wi} - T_{ai})}{C_a} \tag{5}$$

$$T_{woss} = T_{wi} - \frac{\varepsilon C_{min}(T_{wi} - T_{ai})}{C_w} \tag{6}$$

Where:
A = area a-air side w-water side [$m^2$]
$c_p$ = specific heat [$\frac{J}{kg \cdot {}^\circ C}$]
$C_{max}$ = maximum heat capacitance rate of a fluid
[$\frac{J}{s \cdot K}$] = $\dot{m}(c_p)_{max}$
$C_{min}$ = minimum heat capacitance rate of a fluid
$\frac{J}{s \cdot K}$ = $\dot{m}(c_p)_{min}$
$C_r \equiv \frac{C_{min}}{C_{max}}$
D = diameter i-inside o-outside [m]
$\varepsilon$ = total heat exchanger efficiency
$\varepsilon_p$ = heat exchanger efficiency of one pass
h = heat transfer coefficient a-air side w-water side [$\frac{W}{m^2 \cdot {}^\circ C}$]
k = thermal conductivity of coil material, [$\frac{W}{m \cdot {}^\circ C}$]
L = length of heat exchanger [m]
$\dot{m}$ = mass flow rate [$\frac{kg}{s}$]
n = number of coil passes
NTU = Number of Transfer Units
$T_{ai}$ = air inlet temperature [$^\circ C$]
$T_{aoss}$ = steady state air outlet temperature [$^\circ C$]
$T_{wi}$ = water inlet temperature [$^\circ C$]
$T_{woss}$ = steady state water outlet temperature [$^\circ C$]
UA = overall heat transfer coefficient [$\frac{W}{{}^\circ C}$]

The coil hot water to air heat exchanger with this report is 4 pass, counter flow arranged, cross flow, finned tube, and both fluids unmixed. Most of the geometrical data can be found by simple measurements and calculations if not listed in a coil manufacturers catalog. The heat transfer coefficients are usually taken from empirical relationships printed in the literature. The air side and the water side heat transfer correlations for this heat exchanger are taken from Kays and London (Kays an London, 1984). Because the correlations in Kays and London did not exactly match the actual geometry of the heat exchanger, a few adjustments had to be made. The correlations were adjusted slightly to fit experimental steady state results while still retaining the same general form as the Kays and London correlations.

3  CONTROLLER DESIGN

In order to analyze the performance of the neural network controller, a standard SISO (single input single output) PI controller was implemented on the heating coil. The outlet air temperature was the measured value of the controlled variable while the hot water valve position was the controlled variable. The PI control equation is written as follows $$O = K_p e + K_i \int e \, dt \qquad (7)$$

Where:
O is the controller output or valve position
e is the error defined as the difference between the set point and the measured value of the controlled variable $T_{set} - T_{ao}$ [°C]
$K_p$ is the proportional gain constant
$K_i$ is the integral gain constant, [1/s].
Written in discrete time this equation becomes $$O_t = K_p e_t + K_i \sum_{j=0}^{t} e_j \Delta t \qquad (8)$$

Here $\Delta t$ is the sampling rate [s]. Using the discrete time equation at time $t$ and $t-1$ we can write:

$$O_t = K_p e_t + K_i \Delta t \sum_{i=0}^{t} e_i \qquad (9)$$

$$O_{t-1} = K_p e_{t-1} + K_i \Delta t \sum_{i=0}^{t-1} e_i \qquad (10)$$

On subtracting Equation 10 from Equation 9 we have:

$$O_t = O_{t-1} + K_p(e_t - e_{t-1}) + K_i e_t \qquad (11)$$

In order to obtain the proportional and integral constants, the open loop response was used with the system operating at the highest gain expected (Bekker et al., 1991). The high gain state is determined to be at low air flow and low water flow conditions. The PI controller was tuned at this state so that it would remain stable at all other gain states expected by the coil. At low gain states such as those at higher air and water flow rates, the PI constants chosen are expected to produce sluggish control of the outlet air temperature. This sluggish response is expected because the controller will have to actuate a wider range of the valve position to obtain the same outlet air temperature set point change. The Simulink (The Math Works, 1999) implementation of the PI controller is shown in figure 3.

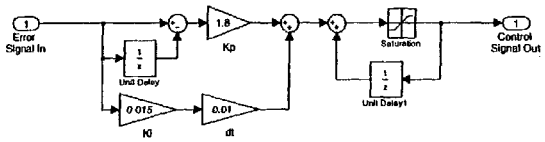

Figure 3: MATLAB implementation of the PI controller

If, at the moment of a set point change or system disturbance, the controller could be set to the value that the integral term would eventually sum to in order to bring the outlet air temperature to the specified set point, then the valve could be repositioned immediately. By positioning the valve instantaneously to the final position, the time that the regular PI controller takes to wind up to this position is eliminated. Moving immediately to the correct steady state output can be accomplished by using a well trained neural network. The output of the neural network will basically "stuff" the control loop with the correct steady state valve position the moment of a set point change instead of reaching that same valve position after the length of time needed for the integral loop to accrue the same value. See figure 4 for the implementation of the stuffing term with the original PI controller discussed previously.

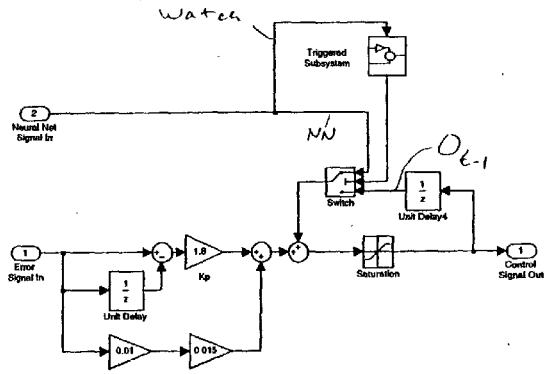

Figure 4: Schematic of PI/net controller

To predict the final steady state valve position, a neural network was created using the Neural Network Toolbox in MATLAB. A schematic of the neural net is shown in figure 5. The network was trained to produce the correct steady state valve position command that corresponds to the state of four coil parameters: inlet air temperature, water inlet temperatures, air flow rate, and outlet air temperature set point. Basically, for three coil inlet conditions, a single valve position exists that will bring the coil outlet air temperature to the desired set point. Knowing the four parameters ensures that the valve position is known also.

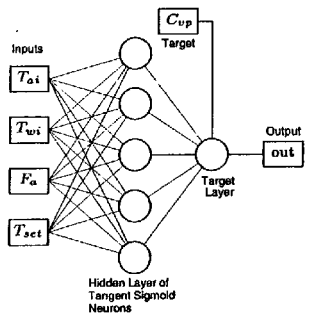

Figure 5: Schematic of the neural network

The neural network was first trained using data sets produced using the steady state model discussed in the previous section. All the input and set point values were chosen randomly within the ranges expected during coil operation. The inlet water temperature ranged between 45 °C and 60 °C, the air inlet temperature between 10 °C and 35 °C, the air flow rate between 0.2 $m^3/s$ and 0.9 $m^3/s$, and the outlet air set point between 30 °C and 55 °C. Using this model, a data set of 2200 input and output pairs was generated. Of this data, 2000 was used for training, 100 for validation, and 100 for testing. A network with five units in the hidden layer was used.

Another neural network was trained using data obtained directly from steady state experiments. To obtain real steady state data, several open loop tests were performed for varying coil inlet conditions. Due to fluctuating measurements, especially the varying air flow rate (the Rocky Mountain foot hills where our laboratory is located are usually quite windy), steady state was only roughly achieved. Steady state was determined to exist when the fluctuating signals were centered around an obvious specific value for more than 100 seconds. To record data at the relative steady state, the mean value of all the signals needed for training were taken over a 50 second period within the region determined to be centered on a specific value. This averaging method was used throughout this study wherever values were extracted from real data. For the neural network trained with real data, 100 data sets were used for training, 30 for validation, and another 30 for performance measure. These 160 data sets contain the same variables used in training that the neural network trained with model data used and they also cover most of the range of the coil inputs. A network with six units in the hidden layer was used.

The next step was to incorporate a neural network in a real time controller. Using the "gensim" command in the MATLAB Neural Net Toolbox, a Simulink model of the neural network was created. The sampling rate was 100 Hz. For every time step, the neural network produced the expected valve position command or $C_{vp}$ that corresponds to the valve position that will bring the coil to the desired set point. This $C_{vp}$ was scaled to the actual valve position, 0 to 100% of the valve stem travel where 0% is a fully closed valve and 100% is a fully open valve. Within the original PI controller, Simulink code was developed that would observe when the network produced a valve position that differed by more 3% from the last time the network intervened in the PI control loop. When the network predicted a valve position that differed by more than 3% from its last prediction, the controller replaces $O_{t-1}$ in equation 11 with the network prediction. For example, if the PI controller of equation 11 has been at steady state for a while and the neural network has been consistently predicting a valve position value of, say 20% open during this time, the neural network does not intervene. If one of the coil inlet conditions changes or the set point changes so as to make the neural net predict a valve position less than 17% open or greater than 23% open, then the neural network intervenes in the PI control loop. At that time step, the neural network replaces the previous control output $O_{t-1}$ with its predicted value so the control equation for this time step becomes $$\text{See spec.} \tag{12}$$

where $$\text{Net Prediction} \approx \text{the PI controller's final value of } K_i \Delta t \sum_{j=0}^{t} e_j \tag{13}$$

The controller output is thus set immediately to what the neural net predicts. As shown by equation 13, the neural net stuffs the control loop with the value that the integral term would eventually obtain in order to reach the specified set point. Thus, the time needed for the effect of the integral term to accrue enough error to bring the controller to reach this steady state value is eliminated. For the next time step, the controller reverts back to the original PI control loop of equation 11. The neural net will not intervene again until it's output value is ±3% more or less than the value it just intervened with.

The deviation of 3% of the valve position was experimentally determined to be the optimum. 5% or greater showed that the neural network did intervene frequently enough and less than 3% showed that the neural net would never give the integral loop a chance to correct steady state error that might be inherited from an inaccurate neural net prediction.

4 CONTROLLER COMPARISON

Sample dynamic comparisons of the PI controller, PI/net controller trained with model data, and the PI/net controller trained with real data for set point changes and disturbance rejections are shown in figures 6 through 9. Rise times for a range of gain states and disturbance rejections are shown in figures 10 through 13.

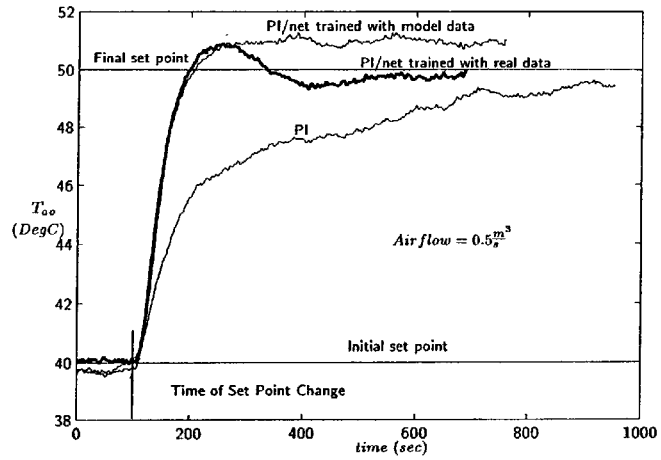

Figure 6: Dynamic Comparison of PI and PI/net Controllers for a Mid to Low Gain Increased Set Point Change As predicted, the PI controller acting alone shows an increasingly sluggish response as the gain of the system lowers as shown in figures 10 through 13. The rise time of the PI controller goes from 100 seconds at the high gain state to 550 seconds at the low gain state. rise times for the PI/net controller trained with model data are around 100 seconds for all gain states. Rise time is defined here as the time it takes for the outlet air temperature to go from $\pm 0.5°C$ from the initial steady state temperature to $\pm 0.5°C$ of the final steady state temperature. Only, at the high gain state, the state where the PI controller was tuned, does the PI controller perform about as well as the PI/net controllers.

The PI controller also shows a slow response for disturbance rejection as compared with the response of the PI/net controllers as shown in figures 12 and 13. Figure 7 shows that both the PI/net controllers regain the temperature set point much faster and also with less temperature change than the PI controller. The outlet air temperature for both PI/net controllers falls almost 1.5 $°C$ below the set point before regaining it within 100 seconds. The PI controller has a rise time of almost 700 seconds and lets the outlet air temperature fall 3.5 $°C$ below the set point before regaining it.

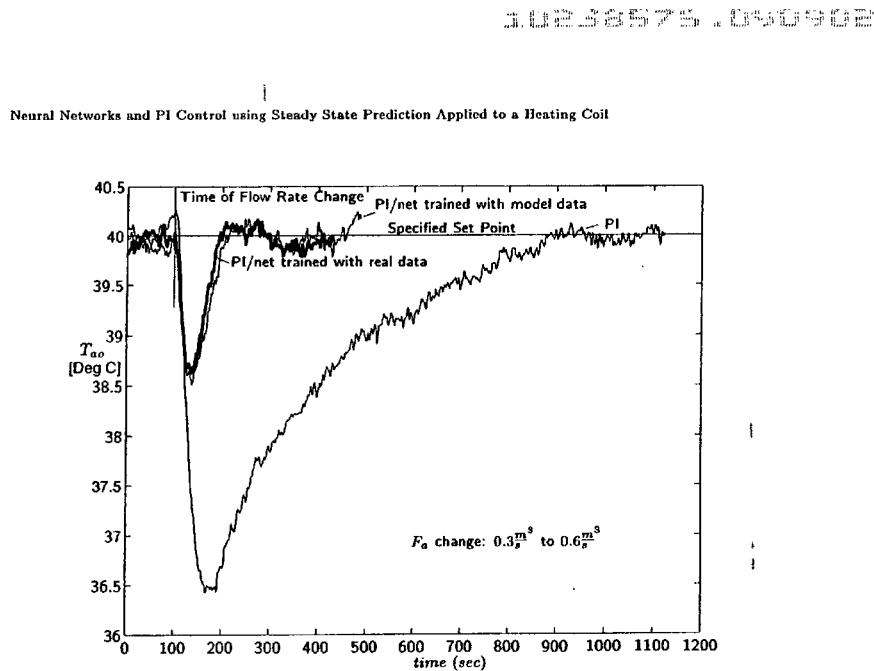

Figure 7: Dynamic Comparison of PI and PI/net Controllers for an Increased Air Flow Rate Change while Retaining Set Point

5 CONCLUSION

In controlling the outlet air temperature on an HVAC hot water-to-air heating coil, it was found that using a neural network to stuff the PI controller loop with the expected controller value needed to achieve a specified outlet air set point shows improved controller performance over the same PI controller acting alone. Not only did the PI/net controller out perform the PI controller in almost every comparison but the PI/net controller also showed a consistent response time of around 100 seconds for the entire range of gain states. The PI controller acting alone would perform well for the gain state at which it was tuned but would perform sluggishly for all other gain states encountered. At low gain states, the PI controller had a rise time of over 600 seconds while the PI/net controller had a rise time of only 100 seconds. This report makes it clear that the addition of a neural network into a PI controller substantially lowers coil response time as well as eliminating the effect of sluggish control experienced when the controller encounters a gain state different than the one it was tuned at.

In addition to the positive results shown here for an HVAC application, clearly the PI/net controller can be implemented on any system where PI control is currently used.

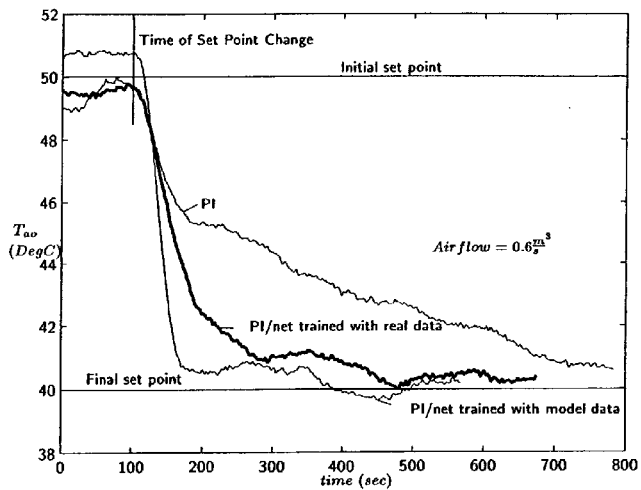
Figure 8: Dynamic Comparison of PI and PI/net Controllers for a Low Gain Decreased Set Point Change
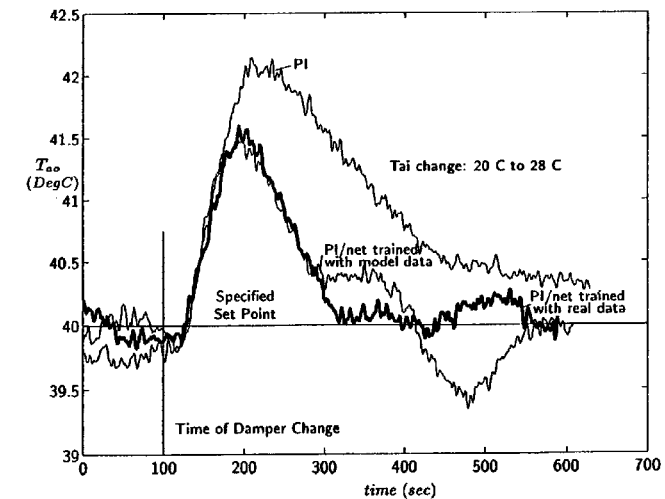
Figure 9: Dynamic Comparison of PI and PI/net Controllers for an Increased Coil Inlet Air Temperature while Retaining Set Point

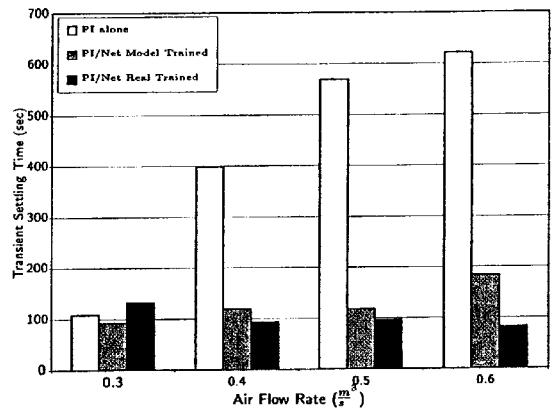
Figure 10: Rise Time Comparison of PI and PI/net Controllers for Varied Gain States with Increased Set Point Changes
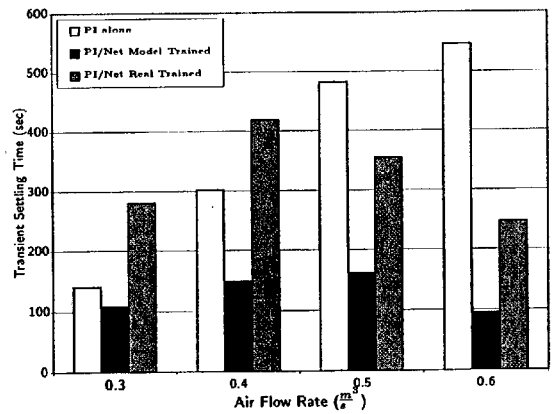
Figure 11: Rise Time Comparison of PI and PI/net Controllers for Varied Gain States with Decreased Set Point Changes

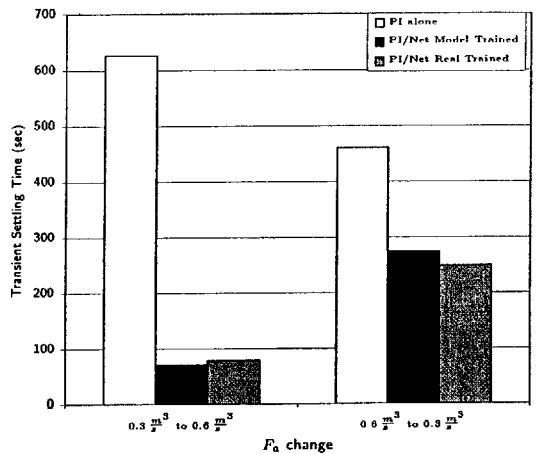
Figure 12: Rise Time Comparison of PI and PI/net Controllers for an Air Flow Rate Change while Retaining Set Point
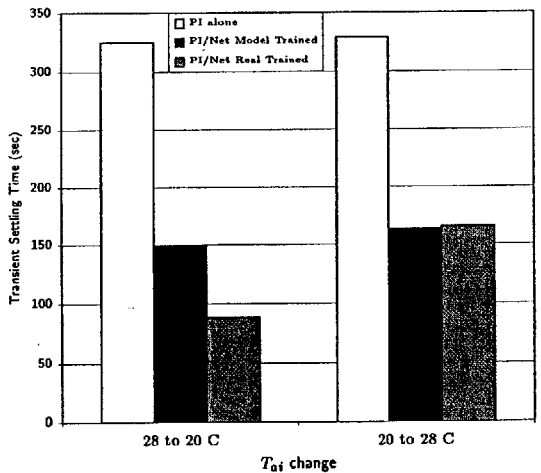
Figure 13: Rise Time Comparison of PI and PI/net Controllers for a Coil Inlet Air Temperature Change while Retaining Set Point

What is claimed is:

1. A neural network controller in parallel with a proportional-plus-integral feedback controller in a control system, the system comprising:
- at least one input port of the neural network controller for receiving an input signal representing a condition of a process;
- a first set of data comprising a plurality of learned output values of the neural network controller obtained during a training period thereof using a plurality of first inputs representing a plurality of conditions of said process; and
- in operation, the neural network controller to contribute to a current output, $O_\tau$, of the proportional-plus-integral feedback controller upon detection of at least one triggering event connected with a condition deviation represented by a change in said input signal at a time, $\tau$, otherwise said neural network controller does not contribute to said current output, $O_\tau$;
- wherein said operation of the neural network controller in communication with the proportional-plus-integral feedback controller, further comprises:
  - (a) upon detection of said triggering event at said time, $\tau$, a respective one of said learned output values, $O_{NN}$, of said first set of data corresponding with said condition deviation is added to the proportional-plus-integral feedback controller current output, $O_\tau$, and at said time, $\tau$, a prior control output value, $O_{\tau-1}$, of the proportional-plus-integral feedback controller associated with a prior time, $\tau-1$, does not contribute to said current output $O_\tau$; and
  - (b) the proportional-plus-integral feedback controller functioning with a proportional gain constant, $K_p$, and an integral gain constant, $K_i$, that remain unchanged during said operation.

2. The system of claim 1 further comprising a second input port for receiving a second input signal representing a second condition of said process; and wherein said first set of data was obtained earlier-in-time, off-line, than said operation of the neural network, and said triggering event comprises a change in any one of said input signals greater-than a preselected amount.

3. The system of claim 2 wherein said plurality of first inputs comprises real input information about said process, said change is caused by an inadvertent disturbance of said process, and said preselected amount comprises a fraction of a prediction value from said first set of data corresponding to a respective of said plurality of first inputs, said fraction selected from a range comprising from 1% to 5%.

4. The system of claim 2 wherein at least one of said input signals represents a condition set-point, said change is caused by an alteration of said condition set-point, and said preselected amount comprises a fraction of a prediction value from said first set of data corresponding to a respective of said plurality of first inputs comprising said input signal for said altered condition set-point.

5. The system of claim 4 wherein said alternation is a manual alteration of said condition set-point said plurality of first inputs comprises real input information about said process, and said fraction is selected from a range comprising from 1% to 5%, and wherein and said change is a result of a detectable process condition deviation.

6. The system of claim 1 wherein said respective one of said learned output values, $O_{NN}$, at said time, $\tau$, is added-in as said replacement for said prior control output value, $O_{\tau-1}$, associated with said prior time, $\tau-1$, according to a discrete form of the proportional-plus-integral feedback controller expression:

$$O_\tau = O_{NN} + K_p e_\tau + K_i e_\tau \Delta t$$

where
- $O_\tau$=proportional-plus-integral controller output
- e=error, equal to the difference between set point and measured value of controlled variable
- $K_p$=proportional gain constant
- $K_i$=integral gain constant
- $\Delta t$=sampling rate, s.

7. The system of claim 6 in which said output value, $O_\tau$, derived by said addition of said respective one of said learned output values, $O_{NN}$, at said time, $\tau$, to the proportional-plus-integral feedback controller as said replacement for said prior control output value, $O_{\tau-1}$, associated with said prior time, $\tau-1$, is used as a process input for said process; and wherein and said triggering event comprises a detectable process condition deviation greater-than a preselected magnitude.

8. The system of claim 1 further comprising second, third, and fourth input ports for receiving, respectively, second, third, and fourth input signals representing a second, third, and fourth condition of said process; and wherein said triggering event comprises a change in any one of said input signals greater-than a preselected amount, said preselected amount comprising a fraction of a prediction value from said first set of data corresponding to a respective of said plurality of first inputs.

9. The system of claim 8 wherein the neural network controller comprises a feed forward controller, said plurality of first inputs comprises real input information about said process, said first set of data being obtained on-line during said operation of the neural network, said fraction selected from a range comprising from 1% to 5%.

10. The system of claim 8 wherein the neural network controller comprises a feed forward controller, said plurality of first inputs comprises simulated input information about said process, said first set of data was obtained earlier-in-time, off-line, from said operation of the neural network, and wherein and said change is a result of a detectable process condition deviation.

11. A neural network controller in parallel with a proportional-plus-integral feedback controller in a control system, the system comprising:
- a plurality of input ports of the neural network controller, each said input pod for receiving a respective input signal representing a respective condition of a process;
- a first set of data comprising a plurality of learned output values of the neural network controller obtained during a training period thereof using a plurality of first inputs representing a plurality of conditions of said process; and
- in operation, the neural network controller to contribute to a current output, $O_\tau$, of the proportional-plus-integral feedback controller upon detection of at least one triggering event, said event comprising a change in any one of said respective input signals at a time, $\tau$, greater-than a preselected amount indicating a condition deviation;
- wherein said operation of the neural network controller in communication with the proportional-plus-integral feedback controller, further comprises:
  - (a) upon said detection at said time, $\tau$, a respective one of said learned output values, $O_{NN}$, of said first set of data corresponding with said condition deviation is added to the proportional-plus-integral feedback controller current output $O_\tau$, and at said time, $\tau$, a prior control output value, $O_{\tau-1}$, of the proportional-plus-integral feedback controller associated with a prior time, $\tau-1$, does not contribute to said current output, $O_\tau$;

(b) otherwise, the system operates with the neural network controller making no contribution to the proportional-plus-integral feedback controller current output $O_\tau$; and (c) the proportional-plus-integral feedback controller functioning with a proportional gain constant $K_p$ and an integral gain constant $K_i$ that remain unchanged during said operation.

12. The system of claim 11 wherein said plurality of first inputs comprises real input information about said process, said change is caused by an inadvertent disturbance of said process, and said preselected amount comprises a fraction of a prediction value from said first set of data corresponding to a respective of said plurality of first inputs, said fraction selected from a range comprising from 1% to 5%.

13. The system of claim 11 wherein the neural network controller comprises a feed forward controller, at least one of said respective input signals represents a condition set-point, said change is caused by an alteration of said condition set-point, and said plurality of first inputs comprises simulated input information about said process.

14. The system of claim 11 wherein said respective one of said learned output values, $O_{NN}$, at said time, $\tau$, is added-in as said replacement for said prior control output value, $O_{\tau-1}$, associated with said prior time, $\tau-1$, according to a discrete form of the proportional-plus-integral feedback controller expression:

$$O_\tau = O_{NN} + K_p e_\tau + K_i e_\tau \Delta t$$

where
$O\tau$=proportional-plus-integral controller output
e=error, equal to the difference between set point and measured value of controlled variable
$K_p$=proportional gain constant
$K_i$=integral gain constant
$\Delta t$=sampling rate, s.

15. A method for controlling a process with a neural network controller operating in parallel with a proportional-plus-integral feedback controller, the method comprising the steps of:

generating a first set of data comprising a plurality of learned output values of the neural network controller obtained during a training period thereof using a plurality of first inputs representing a plurality of conditions of a process;

receiving, at each of a plurality of input ports of the neural network controller, an input signal representing a respective condition of said process; and the neural network controller operating in parallel with the proportional-plus-integral feedback controller to contribute to a current output, $O_\tau$, of the proportional-plus-integral feedback controller upon detection of at least one triggering event, said triggering event comprising a change in any one of said respective input signals at a time, $\tau$, greater-than a preselected amount indicating a condition deviation;

wherein the step of operating further comprises:

(a) upon said detection at said time, $\tau$, a respective one of said learned output values, $O_{NN}$, of said first set of data corresponding with said condition deviation is added to the proportional-plus-integral feedback controller current output, $O_\tau$, and at said time, $\tau$, a prior control output value, $O_{\tau-1}$, of the proportional-plus-integral feedback controller associated with a prior time, $\tau-1$, does not contribute to said current output $O_\tau$; and (b) the proportional-plus-integral feedback controller functioning with a proportional gain constant, $K_p$, and an integral gain constant, $K_i$, that remain unchanged during the operating.

16. The method of claim 15 wherein said step of generating further comprises using real input information about said process for said plurality of first inputs; and said change is caused by an inadvertent disturbance of said process.

17. The method of claim 15 wherein said step of generating further comprises using simulated input information about said process for said plurality of first inputs; said receiving further comprises at least one of said input signals representing a condition set-point; said change is caused by an alternation of said condition set-point; and said triggering event further comprises said preselected amount comprising a fraction of a prediction value from said first set of data corresponding to a respective of said plurality of first inputs comprising said input signal for said altered condition set-point.

18. The method of claim 15 wherein:

said training period is substantially completed prior to said step of receiving said input signals in connection with controlling said process; and said triggering event further comprises said preselected amount comprising a fraction of a prediction value from said first set of data corresponding to a respective of said plurality of first inputs, said fraction selected from a range comprising from 1% to 5%.

19. The method of claim 15 wherein the neural network controller comprises a feed forward controller, and said contribution to said output comprises adding-in said respective one of said learned output values, $O_{NN}$, at said time, $\tau$, as said replacement for said prior control output value, $O_{\tau-1}$, associated with said prior time, $\tau-1$, according to a discrete form of the proportional-plus-integral feedback controller expression:

$$O_\tau = O_{NN} + K_p e_\tau + K_i e_\tau \Delta t$$

where
$O\tau$=proportional-plus-integral controller output
e=error, equal to the difference between set point and measured value of controlled variable
$K_p$=proportional gain constant
$K_i$=integral gain constant
$\Delta t$=sampling rate, s.

20. The method of claim 19 wherein:

said training period takes place at least on-line and during said step of receiving said input signals in connection with controlling said process; and said output value, $o_\tau$, derived by said adding said value of said respective one of said learned output values, $O_{NN}$, at said time, $\tau$, to the proportional-plus-integral feedback controller as said replacement for said prior control output value, $O_{\tau-1}$, associated with said prior time, $\tau-1$, is used as a process input for said process.

* * * * *